United States Patent [19]

Marsili et al.

[11] 3,925,366
[45] Dec. 9, 1975

[54] 1,3-OXAZINO(5,6-C)RIFAMYCINS AND METHOD FOR PREPARING THE SAME

[75] Inventors: Leonardo Marsili; Carmine Pasqualucci, both of Milan, Italy

[73] Assignee: Archivar Industrie Chimiche del Trentino S.p.A., Rovereto, Italy

[22] Filed: May 23, 1974

[21] Appl. No.: 472,886

[30] Foreign Application Priority Data
July 25, 1973  Italy .................................. 27066/73
Jan. 24, 1974  Italy .................................. 19774/74

[52] U.S. Cl. .......................... 260/239.3 P; 424/244
[51] Int. Cl.² ....................................... C07D 498/22
[58] Field of Search ............................... 260/239.3 P Primary Examiner—Henry R. Jiles
Assistant Examiner—Robert T. Bond
Attorney, Agent, or Firm—Waters, Schwartz & Nissen

[57] ABSTRACT

1,3-oxazino(5,6-c)rifamycins compounds having antibacterial activity and suitable as intermediate compounds for producing 3-iminomethyl derivatives of rifamycin SV. The 1,3-oxazino (5,6-c)rifamycin compounds are obtained in a process by which rifamycin S is reacted with a bis-(oxymethyl)-or with a bis-(alkoxymethyl)amine in an inert organic solvent.

7 Claims, No Drawings

1,3-OXAZINO(5,6-C)RIFAMYCINS AND METHOD FOR PREPARING THE SAME

This invention relates to 1,3-oxazino(5,6-c)rifamycins and a method for preparing the same.

It is know that phenols and hydroquinones react with primary amines in the presence of two molecular equivalents of formaldehyde to give benzoxazines(1,3) or bis oxazines(1,3) (J. Am. Chem. Soc. 71, 609; 1949 – 72, 4691; 1950 – 74, 3601; 1952 – 76, 1677; 1954 and J. Org. Chem. 26, 4403; 1961).

It is also known (J. Org. Chem. 27, 2749; 1962) that bis(alkoxymethyl)amines, i.e. the compounds obtained by reacting primary amines with two molecular equivalents of formaldehyde and of an alkanol, are useful reagents capable of converting hydroquinones into bis-oxazines(1,3).

On the basis of the above processes attempts have been made to obtain oxazino rifamycins from rifamycin SV having a hydroquinone-like structure; it has however been found the rifamycin SV does not react at all.

Surprisingly it has now been found that rifamycin S, a quinone-like compound can be converted into an oxazine(1,3) by reaction with a bis-(oxymethyl)-or with a bis-(alkoxymethyl)amine. More particularly, it has been found that by reacting rifamycin S, characterized by the following formula

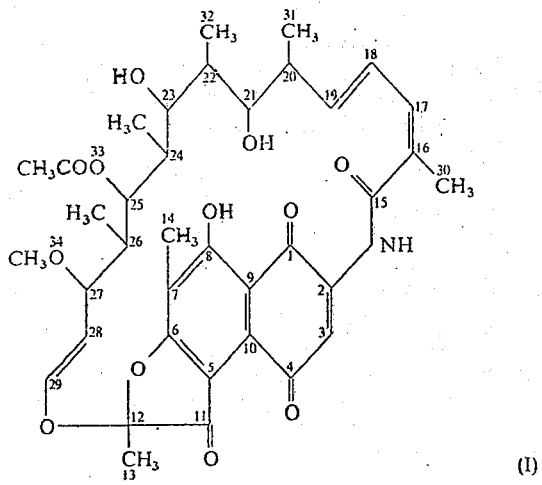

(I)

with a bis-(oxymethyl)-or a bis-(alkoxymethyl)amine, there are obtained new rifamycin compounds (1,3-oxazino (5,6-c)rifamycins) of the following general formula:

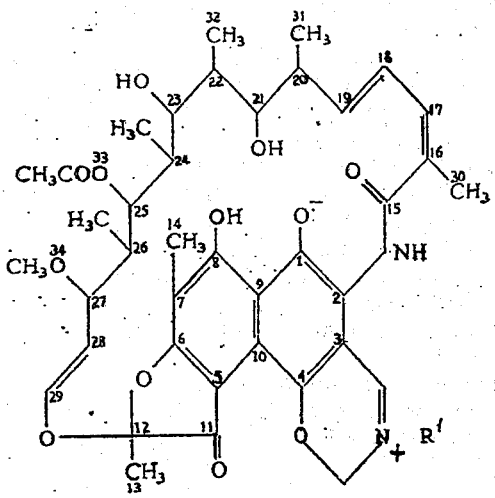

(II)

in which $R^1$ is lower alkyl, lower alkenyl, cycloalkyl having 5 to 6 carbon atoms, phenyl, benzyl, α- or β-phenethyl.

These new rifamycin compounds have the following physical-chemical features: the U.V. spectrum in buffer pH 7 solution shows three absorption maxima respectively near 305 mμ, 355 mμ, and 560 mμ; the NMR spectrum in dimethylsulfoxide solution shows, inter alia, two singlet near δ14,3 and δ9,5; the molecular ion in mass spectrography corresponds, for each compound, to the calculated molecular weight; the I.R. spectrum in nujol mull shows, inter alia, an absorption peak near 3400 cm$^{-1}$ attributed to the νNH of the amide group.

It has also been found that these 1,3-oxazino(5,6-c)rifamycins of formula (II) are useful antibiotic substances and useful intermediates in preparing 3-iminomethyl derivatives of rifamycin SV, in particular rifampicin.

As used herein, the term "lower alkyl" is intended to include straight and branched saturated aliphatic hydrocarbon radicals having 1 to 6 carbon atoms such as methyl, ethyl, propyl, isopropyl, n-butyl, isobutyl, sec.-butyl, tert.butyl, n-pentyl, 2-methyl-butyl, n-hexyl, 2-methyl-pentyl and the like.

The term "lower alkenyl" is intended to include ethylenically unsaturated aliphatic hydrocarbon radicals having 3 to 6 carbon atoms such as allyl, crotyl, methacryl, 3-pentenyl, 3-hexenyl and the like.

The method according to the present invention is characterised in that rifamycin S is reacted with a compound of formula

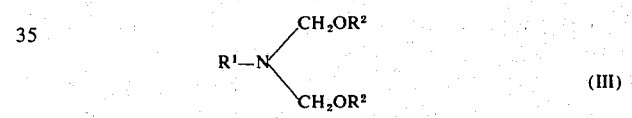

(III)

in which $R^1$ is lower alkyl, lower alkenyl, cycloalkyl having 5 to 6 carbon atoms, phenyl, benzyl, α-or β-phenethyl and $R^2$ is hydrogen or lower alkyl, in an inert organic solvent at a temperature range of 0°C to boiling temperature of the solvent. The reaction is preferably carried out in a dipolar aprotic solvent, but it is understood that rifamycin S reacts with the compounds of the above formula (III) in any other common organic solvent to provide 1,3-oxazino(5,6-c)rifamycins of said formula (II).

The term "dipolar aprotic solvent" is intended to include a highly polar solvent which is no more than a very weak hydrogen bond donor (A. J. Parker, Chemical Reviews 69, 1, 1969). Thus, such term includes solvents such as dimethyl-sulfoxide, dimethylacetamide, dimethylformamide, hexamethylphosphotriamide, acetonitrile, N-methylpyrrolidone, acetone and the like. The reaction time depends both on the solvent employed and the compound of formula (III) used as a reactant. Practically, by increasing the molecular weight of the amine (III) and decreasing the polarity of the solvent, the reaction time is prolonged and the yields of product (II) diminish because of the presence of reaction by-products and/or unreacted starting material which must be removed. When a compound of the above formula (III), where $R^1$ is for example methyl, ethyl, tert.butyl, or allyl is used and the reaction is carried out in a dipolar aprotic solvent, such as dimethylsulfoxide, dimethylacetamide or dimethylformamide at a temperature range of 15° to 100°C, substantially pure compound (II) is obtained in about quantitative yield and in a very short reaction time, ranging from a few minutes to 2 hours. Where a compound of the above formula (III) wherein $R^1$ is a cycloalkyl, phenyl or phenylalkyl group, is used as a reactant, the reaction time can increase.

Generally, when the reaction is carried out in apolar or in protic polar solvent, such as benzene, dioxane, tetrahydrofuran or alcohols, the reaction time can be as high as 3 - 4 hours and the desired final product should be separated from the by-products by fractional crystallization or extraction from suitable solvents.

The oxazino(5,6-c)rifamycins (II) thus obtained are isolated according to well known methods, such as by simple filtration or extraction, evaporation and crystallization.

The new 1,3-oxazino(5,6-c)rifamycins of the present invention are useful antibiotic substances which are very active against pathogenic bacteria, particularly against gram-positive and gram-negative micro-organisms such as *Staphylococcus aureus, Streptococcus pyogenes, Escherichia coli*.

Furthermore, the 1,3-oxazino(5,6-c)rifamycins, which are now available because of the new method of the present invention, are useful intermediates in preparing 3-iminomethyl derivatives of rifamycin SV described in the French Pat. No. 1,457,435, particularly the very important antibiotic compound referred to as rifampicin. The conversion of the oxazino(5,6-c)rifamycins of formula (II) to the 3-iminomethyl derivatives of rifamycin SV is accomplished by reaction with primary amines, hydrazine, monosubstituted hydrazines, asimmetric disubstituted hydrazines. For example, by reacting a compound of formula (II) with 1-amino-4-methyl-piperazine in the presence of a secondary or a tertiary amine, rifampicin is obtained in substantially quantitative yield in a very short period of time, ranging from 15 minutes to 3 hours. The compounds of the above formula (III) are prepared by reacting an amine of formula $R^1$—$NH_2$ either with two equivalents of formaldehyde to obtain a bis hydroxymethyl derivative (formula III, $R^2$=H) or with two molar equivalents of both formaldehyde and an alcohol of formula $R^2OH$ to obtain a bis (lower alkoxymethyl) derivative (formula III, $R^2$ = lower alkyl). The procedure of this preparation is described in J. Chem. Soc. 123, 532,(1923). The following examples illustrate the invention.

EXAMPLE 1

Compound of formula II, $R^1$ = t.-butyl.

A solution of 6.5 g. N.N dihydroxymethyl-t-butylamine, 40 ml. dimethylformamide and 13.9.9. rifamycin S was stirred in a 100 ml. four-necked flask for 60 minutes at 33°C. The reaction mixture was poured into 300 ml. water acidified with 2 ml. acetic acid. The precipitate thus obtained was filtered, washed with water and dried at 40°C, under vacuum. Yield: 14,5 g.

The infrared spectrum in chloroform solution showed peaks at 3500, 1715, 1680, 1650, 1605, 1380, 1325, 975 cm$^{-1}$.

EXAMPLE 2

Compound of formula II, $R^1$ = allyl.

In a 100 ml. four-necked flask, 13.9 g. rifamycin S were dissolved in 40 ml. of dimethylacetamide, then 7 g. N,N diisopropoxymethyl-allylamine were added and the solution heated for 15 minutes at 70°C. The reaction mixture was poured into 300 ml. water acidified with 2 ml. acetic acid and the precipitate obtained filtered, washed with water and dried at 40°C, under vacuum. Yield: 14.3 g.

The infrared spectrum in chloroform solution showed peaks at 3500, 1740, 1720, 1650, 1605, 1380, 1330, 975 cm$^{-1}$.

EXAMPLE 3

Compound of formula II, $R^1$ = cyclohexyl.

A mixture of 13.9 g. rifamycin S, 6,5 g. N,N dimethoxymethyl-cyclohexylamine and 40 ml. dimethylsulfoxide was kept in a 100 ml. four-necked flask at 50°C for 45 minutes.

The reaction mixture was poured into 300 ml. water acidified with 2 ml. acetic acid. The precipitate thus obtained was filtered, washed with water and dried at 40°C, under vacuum. Yield: 15.3 g.

The infrared spectrum in chloroform solution showed peaks at 3500, 1720, 1610, 1380, 1340, 980 cm$^{-1}$.

In the same manner, by reacting rifamycin S with N,N-dimethoxymethyl-cyclopentylamine, the corresponding compound of the above formula II, where $R^1$ is cyclopentyl, was obtained.

EXAMPLE 4

Compound of formula II, $R^1$ = benzyl.

In a 100 ml. four-necked flask 13.9 g. rifamycin S were dissolved in 40 ml. hexamethylphosphotriamide, then 7.5 g. N,N diethoxymethylbenzylamine were added and the solution was kept for 20 minutes at 60°C. The reaction mixture was poured into 400 ml. water acidified with 2 ml. acetic acid and the precipitate thus obtained was filtered, washed with water and dried at 40°C, under vacuum. Yield: 15.8 g.

The infrared spectrum in chloroform solution showed peaks at 3500, 1740 (sh), 1710, 1680, 1650, 1605, 1380, 1320, 980 cm$^{-1}$. In the same manner, by reacting rifamycin S with N,N-dimethoxymethyl-$\alpha$-phenethylamine and with N,N-dimethoxymethyl-$\beta$-phenethylamine, the corresponding compounds of the above formula II where $R^1$ is $\alpha$-phenethyl or $\beta$-phenethyl, were obtained.

EXAMPLE 5

Compound of formula II, $R^1$ = methyl.

In a 100 ml. four-necked flask 14 g. rifamycin S were dissolved in 40 ml. acetone then 5 g. N,N-diisobutoxymethyl-methylamine were added and the solution was stirred for 3 hours at 40°C. The reaction mixture was poured into 300 ml. water acidified with 3 ml. acetic acid and the precipitate thus obtained was filtered, washed with water and dried at 40°C, under vacuum. Yield: 13.8 g. crude product.

The crude product was mixed with 60 ml. toluene in a 100 ml. flask, the mixture stirred for 10 minutes at 60°C and then filtered to give 12.5 g. pure product.

The U.V. spectrum in phosphate buffers pH 7 showed the following absorption maxima $\lambda_{max}$ 305 m$\mu$, 354 m$\mu$, 560 m$\mu$.

In the mass spectrometry the ion-molecular peak had a mass of 750.

Furthermore, the spectrum NMR of solution in dimethylsulfoxide showed singlets at $\delta$ = 1.65, 1.92, 1.99, 2.96, 3.71, 9.49, 14.24. There were no peaks in negative fields.

EXAMPLE 6

Compound of formula II, $R^1$ = methyl.

A mixture of 14 g. rifamycin S, 50 ml. n-propyl alcohol and 5.5 g. N,N-diisobutoxymethyl-methylamine was stirred in a 100 ml. four-necked flask at 60°C for 60 minutes. The reaction solution was poured into 500 ml. water acidified with 5 ml. acetic acid, then the precipitate thus obtained was filtered, washed with water and dried at 40°C, under vacuum to give 12.2 g. crude product. The crude product was dissolved in 100 ml. chloroform and a mixture of 250 ml. toluene and 750 ml. petroleum ether was added. The precipitate thus obtained was filtered and dried at 40°C, under vacuum to yield 4.2 g. pure product, identical to that described in example 5.

In the same manner, by reacting rifamycin S with N,N-diisobutoxymethyl-aniline, the corresponding compound of the above formula II, where $R^1$ is phenyl, was obtained.

EXAMPLE 7

7.9 g. compound of formula II, where $R^1$ is t.butyl, prepared as described in Example 1, were dissolved in 30 ml. tetrahydrofuran in a 100 ml. four-necked flask. A mixture of 2.8 g. pyrrolidine and 1.38 g. 1-amino-4-methylpiperazine was added. After 20 minutes stirring at room temperature the reaction was over. The reaction mixture was dissolved in 100 ml. chloroform, acidified to pH 5 with diluted acetic acid and washed with water. The chloroformic phase was dried with sodium sulfate and, after filtration, the solvent was evaporated. Yield: 8.2 g. Recrystallization from acetone yielded 7.2 g. unitary product as thin layer chromatography showed.

The product was identical to an authentic specimen of rifampicin.

What we claim is:

1. 1,3-oxazino(5,6-c)rifamycin compounds, characterized by the formula

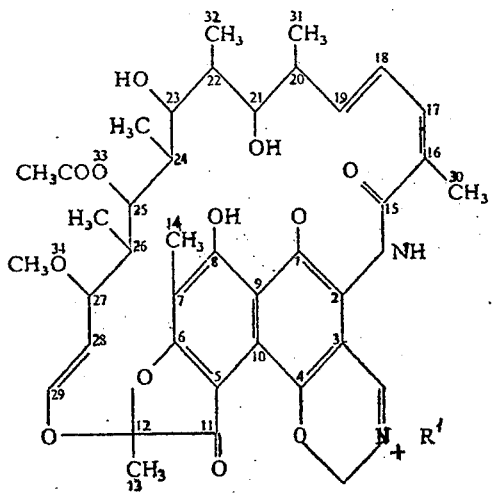

(II)

wherein $R^1$ is lower alkyl, lower alkenyl, cycloalkyl having 5 to 6 carbon atoms, phenyl, benzyl, α- or β-phenethyl.

2. Rifamycin compounds according to claim 1, wherein $R^1$ is t.butyl.

3. Rifamycin compounds according to claim 1, wherein $R^1$ is allyl.

4. Rifamycin compounds according to claim 1, wherein $R^1$ is methyl.

5. A method for preparing 1,3-oxazino(5,6-c)rifamycins of formula

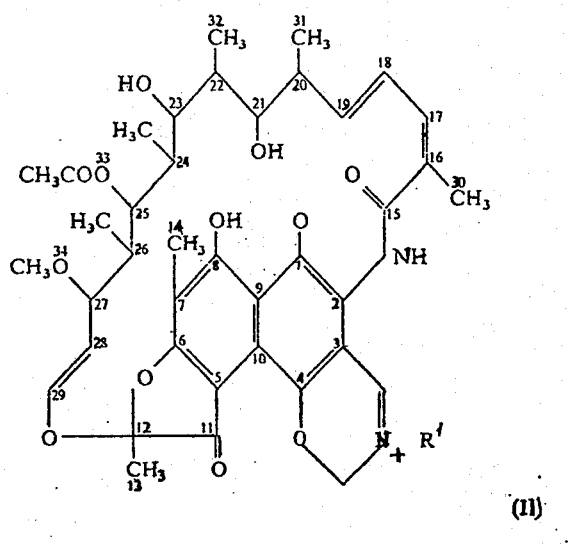

(II)

wherein $R^1$ is lower alkyl, lower alkenyl, cycloalkyl having 5 to 6 carbon atoms, phenyl, benzyl or α- or β-phenethyl, which comprises reacting rifamycin S with a compound of formula

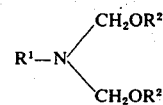

in which $R^1$ is as above defined and $R^2$ is hydrogen or lower alkyl, in an inert organic solvent at a temperature ranging from 0°C to the boiling temperature of the solvent to give a solution which is treated with water acidified at a pH from about 4 to about 6, the water and the solvent being then removed to give a solid mass with the desired product.

6. A method according to claim 5, wherein said inert organic solvent is a dipolar aprotic solvent and said temperature is from 15° to 100°C.

7. A method according to claim 6, wherein said dipolar aprotic solvent is dimethylsulfoxide, dimethylformamide or dimethylacetamide.

* * * * *